United States Patent Office 3,306,756
Patented Feb. 28, 1967

3,306,756
COMPOSITION AND METHOD FOR
STABILIZING SOIL
George A. Miller, Painesville, Ohio, assignor to Diamond Alkali Company, Cleveland, Ohio, a corporation of Delaware
No Drawing. Filed July 1, 1963, Ser. No. 292,073
28 Claims. (Cl. 106—84)

This invention relates to a composition and a method for controlling the gelation time of alkali metal silicate-containing soil stabilizing compositions. More particularly, the present invention relates to a composition and a method for controlling the gelation time of alkali metal silicate-containing soil stabilizing compositions by incorporating therein certain additive compounds capable of accelerating the gel time of the silicate composition.

In recent years, the use of liquid alkali metal silicate compositions to strengthen substrata or render porous substrata impermeable to water has become well known and widely used. When placed in the soil, the liquid composition forms an insoluble gel having high strength, thereby enabling excavation in construction work to be safely performed in the treated soil. However, as a result of premature gelling, undesired gelation frequently occurs at the immediate site of injection which thereby tends to plug the soil pores and prevent uniform mixing and reaction resulting in a non-uniform gel structure in the soil with resultant nongelled sections where stabilization is desired. Generally, in order to decrease gelation time and move the soil stabilization composition into the soil to obtain a homogeneous mixture of soil and stabilization composition, it has been the practice to dilute the soil stabilizing composition; however, it has been found that the strength of the resultant gel is relatively low. Further, dilution of the soil stabilizing composition adds the further disadvantage of handling large volumes of dilute aqueous mixtures with the resultant increased equipment and labor cost.

The present invention overcomes the above disadvantages by providing a method for controlling the gel time and, in particular, a method for accelerating the gel time of a soil stabilizing composition giving a uniform gel structure having high strength. Further, the need for high strength gels, particularly with accelerated gel time operable over a wide range of temperatures at which such soil stabilizing compositions may be used, e.g., 0° F. up to about 200° F., or more, is satisfied by the present invention. The gel acceleration of the soil stabilizing composition of this invention has been found to be operable at temperatures within the normal operating ranges, e.g., 30° F. to 100° F., particularly within the range of 40° F. to 75° F.

Broadly, the present invention comprises the use of a composition of matter comprising a mixture of (1) an alkali metal silicate, (2) an amide and/or reactive salt, (3) water and (4) at least one compound capable of accelerating the gelation of the soil stabilizing composition selected from the following structures:

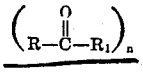

wherein R is either hydrogen or a hydrocarbon radical (aliphatic, straight or branched, cyclic or aromatic, saturated or unsaturated, substituted or unsubstituted) of from about 1 to 22, preferably 1 to 12, carbon atoms and $R_1$ is either a hydrocarbon radical from about 1 to 22, preferably 1 to 12, carbon atoms or —OR, and $n$ is an integer from 1 to 100, inclusive;

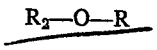

wherein $R_2$ is a hydrocarbon radical of from 1 to 22, preferably 1 to 12 carbon atoms and R is defined above;

wherein $R_3$ is a lower alkyl radical of from 1 to 4 carbon atoms and $R_4$ is either $R_3$, $R_3$—O—$R_3$— or

—$R_3$—O—$R_3$—O—$R_3$— mixtures thereof; and mixtures of formaldehyde with at least one of the above compounds.

As used in the specification and claims, the term "alkali metal silicate" is intended to refere to alkali metal silicates having an alkali metal oxide:silicon dioxide weight ratio within the range from about 1.0:3.0–4.0; notably sodium silicates having a sodium oxide:silicon dioxide weight ratio within the range from about 1.0:3.0–4.0, preferably about 1.0:3.0–3.5. An especially preferred material is an aqueous sodium silicate having a sodium oxide:silicon dioxide ratio of about 1.0:3.2–3.3, and having a $Na_2O$-$SiO_2$ solids content of about 35 to 45 percent. The term "alkali metal," as used in the specification and claims, is intended to refer to the various alkali metals, i.e. sodium, potassium, lithium, rubidium, cesium and mixtures thereof. Silicates of potassium and sodium are more generally available. Because of their lower cost and availability, sodium silicates are more widely used and therefore are preferred in the practice of the present invention. Particular reference hereinafter is made to such silicates.

The amides which may be employed in compositions of this invention are those disclosed in U.S. Pat. No. 2,968,572, issued January 17, 1961, to Cletus E. Peeler, Jr., hereby incorporated by reference, such amides having the structure

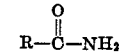

wherein R is selected from the group consisting of H, lower alkyl, —$CONH_2$ and lower alkyl-substituted amido groups. Specific illustrative amides are formamide, acetamide, propionamide and butyramide. A preferred amide is formamide (M.P. 2.5° C.).

This invention is especially concerned with alkali metal silicate compositions which may contain, in lieu of or in addition to the amide, a reactive salt capable of rapidly reacting with the alkali metal silicate to form, with the silicate, a completely or substantially water-insoluble gel having an accelerated gel time. In some applications, for example, in the treatment of soil at a depth below the existing water level, ground moisture present could be a disadvantage in dissolving or dispersing the initially formed gel. Accordingly, in such a situation it is the preferred practice of this invention that the silicate-amide-accelerator composition employed additionally contain a reactive salt for the purpose of imparting a high degree of initial water-insolubility to the initial gel formed from the four-component, i.e., silicate-amide-reactive salt-accelerator composition. The term "reactive salt," as used in the specification and claims, is intended to mean those salts which chemically react with aqueous alkali metal silicate to produce a completely or substantially water-insoluble gel. Specific reactive salts include sodium aluminate, aluminum chloride, ammonium chloride, copper sulfate, zinc chloride and calcium chloride, with calcium chloride being preferred. When a reactive salt is used, it generally is incorporated as an aqueous solution in a concentration within the range of from about 25 grams per liter up to saturation.

The additive compounds, capable of accelerating the gel time of soil stabilizing compositions, which may be admixed therewith, include carboxylic acids; esters of carboxylic acids; ketones, alcohols; linear aldehydes other than formaldehyde and their linear polymers; cyclic polymers of the lower alkyl aldehydes; dioxane; mixtures of the above compounds and mixtures of formaldehyde with at least one of the above compounds.

Illustrative of suitable carboxylic acids are the saturated aliphatic acids, e.g., formic, propionic, butyric, pentanoic, myristic, palmetic, stearic, and the like; the aromatic acids, e.g., benzoic, toluic, and the like; dibasic acids, e.g., oxalic, sebacic, phthalic, and the like; the unsaturated acids, e.g., acrylic, vinyl acetic, crotonic, cinnamic, and the like; the substituted acids, e.g., malic, lactic, tartaric, chloroacetic, pyruvic, glycine, salicylic, aminobenzoic, and the like.

Illustrative of suitable ketones are the saturated aliphatic ketones, e.g., acetone, methyl ethyl ketone, methyl isopropyl ketone, methyl isobutyl ketone, and the like; the unsaturated ketones, e.g., methyl vinyl ketone, ethylidene acetone, allylacetone, mesityl oxide, phorone, and the like; the cyclic ketones, e.g., cyclopentanone, methyl cyclopentyl ketone, and the like; substituted ketones, e.g., monobromoacetone, acetol, methyl glyoxal, p-hydroxyacetophenone, and the like; and the aromatic ketones, e.g., benzophenone, acetophenone, dibenzyl ketone, benzil, and the like.

Illustrative of suitable alcohols are the saturated aliphatic alcohols, e.g., methanol, ethanol, butanol, amyl alcohol, hexanol, decanol, lauryl alcohol, cetyl alcohol, stearyl alcohol, and the like; the cyclic alcohol, e.g., cyclohexanol, and the like; the unsaturated alcohols, e.g., allyl alcohol, methyl vinyl carbinol, allyl carbinol, and the like; the aromatic alcohols, e.g., benzyl alcohols and the above alcohols substituted with, for instance, a halogen, amino group, and the like.

Illustrative of suitable esters are the reaction product of the above mentioned acids and alcohols, such as for instance, the reaction product of amyl alcohol and acetic acid, e.g., amyl acetate. Other esters include methyl propionate, ethyl propionate, and the like.

Illustrative of suitable ethers are the saturated aliphatic, e.g., dimethyl ether, diethyl ether, dipropyl ether, dibutyl ether, and the like; the unsaturated ethers, e.g., methyl vinyl ether, and the like; substituted ethers, e.g., alpha-chloromethyl ether, and the like; aromatic ethers, e.g., diphenyl ether, anisole, phenetole, and the like; diethylene glycols and the ether glycols, e.g., monomethyl ether of ethylene glycol, monobutyl ether of ethylene glycol, butyl carbitol, and the like.

Illustrative of suitable aldehydes capable of decreasing the gel time of soil stabilizing compositions containing an alkali metal silicate are the saturated aliphatics, e.g., acetaldehyde, propionaldehyde, butyraldehyde, isobutyraldehyde, glyoxal, and the like; unsaturated, e.g., acrolein, crotonaldehyde, and the like; aromatic, e.g., benzaldehyde, cinnamic, salicylaldehyde, o-chlorobenzaldehyde, coumarin, and the like; the linear polymers of the lower alkyl aldehydes; the cyclic polymers of the lower alkyl aldehydes, e.g., trioxane (a cyclic trimer of formaldehyde), paraldehyde (cyclic trimer of acetaldehyde), and metaldehyde (cyclic tetramer of acetaldehyde); mixtures of the above aldehydes, e.g., an acetaldehyde-propionaldehyde mixture, a propionaldehyde-trioxane mixture, a trioxane-paraldehyde mixture, and the like.

Although the gel time increases when formaldehyde is added to the soil stabilizing composition as disclosed in copending application Serial No. 292,124, filed July 1, 1963, hereby incorporated by reference, it has now been found that gelation time is accelerated when a mixture of formaldehyde and at least one of the above accelerators is used in the stabilizing composition. For instance, when a formaldehyde-trioxane mixture is used, wherein at least 50 percent of the formaldehyde-trioxane-added water content of the total stabilization composition comprises a trioxane solution containing 100 grams trioxane per liter of water, gelation times are accelerated (Example 7).

From the discussion of the invention thus far, it will be understood that the composition of this invention incorporates at least sufficient water to render the composition fluid; however, except in those instances where a dilute solution is desired for reasons of economy and to enhance injectivity, substantial dilution is to be avoided. Generally, at least a portion of the necessary water may advantageously be incorporated by using a commercial aqueous alkali metal silicate described above with additional water being added if desired, as by an admixture of the water with the amide and/or reactive salt which may be employed.

It will be appreciated that the proportions of alkali metal silicate, accelerator, amide and/or reactive salt, and added water, as well as the amount of soil treated with a given quantity of such a composition, varies widely depending on the porosity, permeability and type of soil, nature of substrata if subsoil applications are intended, and the like. Accordingly, it generally is not feasible to define, in terms of proportions, a composition which represents an optimum material for use in all types of solidification and/or stabilization operation.

However, effective soil stabilization compositions of the present invention comprise from about 5 to 97.9 percent, preferably about 35 to 75 percent, by volume, of the total composition of an aqueous alkali silicate containing about 35 to 45 percent solids; about 2 to 65 percent, preferably 5 to 30 percent, by volume, of the total composition of an amide and/or an aqueous solution of the reactive salt; and from about 0.1 to about 30 percent, preferably about 1 to about 30 percent, by volume of the total composition of the accelerator and the balance of the soil stabilizing composition being added water (water beyond that separately admixed with either alkali silicate, amide and/or reactive salt).

As mentioned above, the gelation time is further accelerated when the reactive salt is present in the stabilizing composition in addition to the silicate and amide. This further acceleration is proportional to the concentration of the reactive salt. The relationship between gel time and reactive salt concentration may easily be determined by any suitable test procedure. Once the relationship is determined for a given composition, the addition of specific amounts of reactive salt provides predictable gel times, thereby enabling the user of the composition of this invention to schedule operations accordingly.

The accelerator may be added to the composition either by incorporating it into the alkali metal silicate solution directly or by adding the accelerator to the amide solution and/or reactive salt solution, and then combining it with the alkali metal silicate to form the soil stabilizing composition. If storage of the reactants is required, incorporation of the accelerator directly into the alkali metal silicate solution is not recommended because the silicate solution containing the accelerator will gel. Preferably, the accelerator is added to the amide or reactive salt component before the amide or reactive salt is added to the silicate, or if a reactive salt is to be used in addition to the amide, to the amide-reactive salt solution. However, if desired, the accelerator can be added separately to the alkali metal silicate solution at the same time that the amide and/or reactive salt is added.

The term "soil," as used in the specification and claims, is intended to refer to various types and compositions of soil including sand, loam, porous or fissured rock, and the like; for example, as described in pages 614–633 of vol. 12 of the Kirk-Othmer Encyclopedia of Chemical Technology.

In order that those skilled in the art may more completely understand the present invention and the preferred method by which the same may be carried into effect, the following specific examples may be offered:

Example 1

Samples of soil stabilizing compositions are prepared containing, by volume, 50 percent sodium silicate solution, 10 percent formamide, 10 percent calcium chloride solution (50 grams per liter), and the remainder accelerator and added water, as follows:

Into a 16-ounce wide-mouthed bottle are placed 175 g. (125 ml.) of sodium silicate, grade 40 (1 $Na_2O:3.22\ SiO_2$, average solids content 38.35 percent by weight, 41.5° Bé at 20° C.), 25 ml. of calcium chloride solution (50 g. per liter), 25 ml. of formamide and the balance water. The calcium chloride, formamide and water are thoroughly mixed prior to their addition to the sodium silicate. The accelerator is either added to the sodium silicate, or to the water-calcium chloride-formamide mixture, as indicated in Table I. The total volume of the samples is 250 ml. The individual components in the accelerator mixtures (Samples 14 to 16) are present in equal amounts, by volume.

The compositions are allowed to gel at a temperature within the range of about 70° F. to 75° F., and the time required for gelation is noted. The gel time of the individual runs is determined with a Mol-Rez Gel Time Meter. (Mol-Rez Div. of The American Petrochemical Corp., Minneapolis, Minn.) The results are reported in Table I below.

of trioxane to the silicate gives a gel time of 7 minutes, even though the trioxane is not all dissolved in the silicate (Sample 7). When the same amount of trioxane is dissolved in water, then added to a calcium chloride-formamide solution, and then added to the silicate, the gel time is only 1.5 minutes (Sample 8). Also, when the amount of trioxane is doubled (Sample 9), the gel formed immediately. The addition of 2 percent, by volume, of a trioxane solution (50 g. per liter) with the equivalent of 0.25 grams of trioxane gives a gel time of 20 minutes. When the trioxane solution (50 g. per liter) is increased to 4 percent, by volume, the gel time is decreased to 13 minutes. As can be seen from the data in Table I, other accelerators within the scope of the present invention decreases the gelation time of the soil stabilizing composition. Also, as can be further seen from the results reported, the acceleration in gel time is directly proportional to the amount of accelerator added to the stabilizing composition.

Example 2

A series of soil stabilizing compositions are prepared according to the method of Example 1, with the exception that the compositions contain, by volume, 50 percent sodium silicate solution, 12 percent formamide, 15 percent calcium chloride solution (50 g. per liter), and the remainder added water and accelerator. The accelerator is added to the composition in two diffeernt methods, as indicated in Table II, either by addition to the sodium

TABLE I

| Sample No. | Accelerator | Method of Adding Accelerator | Accelerator (g.) | Accelerator (Vol. Percent) | Water (Vol. Percent) | Gel Time (Min.) |
|---|---|---|---|---|---|---|
| 1 | | | | 0 | 30 | 41 |
| 2 | Acetaldehyde | To $H_2O$—$CaCl_2$—$CHONH_2$ mixture | | 1 | 29 | 7 |
| 3 | do | do | | 3 | 27 | 1 |
| 4 | Propionaldehyde | do | | 2 | 28 | 1 |
| 5 | n-Butyraldehyde | do | | 2 | 28 | 1 |
| 6 | Paraldehyde | do | | 2 | 28 | 1 |
| 7 | Trioxane | To Silicate | 5 | | 28.4 | 7 |
| 8 | do | To $H_2O$—$CaCl_2$—$CHONH_2$ mixture | 5 | | 28.4 | 1.5 |
| 9 | do | do | 10 | | 26.6 | (3) |
| 10 | Trioxane [1] | do | | 2 | 28 | 20 |
| 11 | do [1] | do | | 4 | 26 | 13 |
| 12 | Dioxane | do | | 2 | 28 | 1 |
| 13 | Furfural | do | 5 | 2 | 28 | 3 |
| 14 | Propionaldehyde-acetaldehyde | do | | 2 | 28 | 4 |
| 15 | Propionaldehyde-trioxane | do | | 2 | 28 | 3 |
| 16 | Trioxane-paraldehyde | do | | 2 | 28 | 1 |
| 17 | Acetone | do | | 2 | 28 | 1 |
| 18 | Methyl ethyl ketone | do | | 2 | 28 | 1 |
| 19 | Formic acid | do | | 0.4 | 29.6 | 12 |
| 20 | do | do | | 1 | 29 | [4] 20 |
| 21 | do | do | | 2 | 28 | (3) |
| 22 | Lactic acid | do | | 1 | 29 | 5 |
| 23 | do | do | | 2 | 28 | (3) |
| 24 | Butyl acetate [2] | do | | 2 | 28 | 18 |
| 25 | Amyl acetate [2] | do | | 2 | 28 | 34 |
| 26 | Methanol | do | | 2 | 28 | 6 |
| 27 | Ethanol | do | | 2 | 28 | 3 |
| 28 | Diethyl ether | do | | 2 | 28 | 8 |
| 29 | do | do | | 4 | 26 | (3) |

[1] 50 g./liter solution of trioxane and water.
[2] Not completely dissolved in aqueous system.
[3] Instant gelation.
[4] Seconds.

In a soil stabilizing composition, having a gel time of 41 minutes, the addition of varying amounts of alkyl aldehydes results in gel times of 7 and 1 minute, respectively. Trioxane (the cyclic trimer of formaldehyde) is added to the soil stabilizing composition either in a solid form (Samples 7 to 9), or a water solution containing 50 grams of trioxane per liter (Samples 10 and 11). The addition silicate directly (Samples 45 and 46), or by addition to the water-calcium chloride solution-formamide mixture and then mixing with the silicate (Samples 31 to 44). In Sample 47, the paraldehyde and trioxane are present in the accelerator mixture in equal amounts, by volume. The gel times are determined with a Mol-Rez Gel Time Meter. The results are reported in Table II.

TABLE II

| Sample No. | Accelerator | Method of Adding Accelerator | Accelerator (g.) | Accelerator (Vol. Percent) | Water (Vol. Percent) | Gel Time (Min.) |
|---|---|---|---|---|---|---|
| 30 | | | | | 23 | 6 |
| 31 | Acetaldehyde | To H$_2$O—CaCl$_2$—CHONH$_2$ mixture | | 1 | 22 | 1 |
| 32 | do | do | | 3 | 20 | (²) |
| 33 | Propionaldehyde | do | | 2 | 21 | (²) |
| 34 | do | do | | 4 | 19 | (²) |
| 35 | do | do | | 8 | 15 | (²) |
| 36 | n-Butyraldehyde | do | | 5 | 18 | (²) |
| 37 | do | do | | 10 | 13 | (²) |
| 38 | iso-Butyraldehyde | do | | 5 | 18 | (²) |
| 39 | do | do | | 10 | 13 | (²) |
| 40 | Benzaldehyde | do | | 7 | 16 | (²) |
| 41 | O-Chlorobenzaldehyde | do | | 10 | 13 | (²) |
| 42 | Paraldehyde | do | | 6 | 17 | (²) |
| 43 | Trioxane¹ | do | | 4 | 19 | (²) |
| 44 | do | do | 5 | | 21.2 | (²) |
| 45 | do | To Silicate | 5 | | 21.2 | (²) |
| 46 | do | do | 10 | | 19.4 | (²) |
| 47 | Paraldehyde-trioxane | To H$_2$O—CaCl$_2$—CHONH$_2$ mixture | | 2 | 21 | (²) |
| 48 | Acetone | do | | 2 | 21 | (²) |

¹ 50 g./liter solution of trioxane and water.
² Instant gelation.

*Example 3*

This example illustrates that the accelerators of the present invention are operative and decrease the gelation time of soil stabilizing compositions which do not contain an amide.

A series of soil stabilizing compositions are prepared according to the method of Example 1 with the exception that the compositions contain, by volume, 50 percent sodium silicate solution, 20 percent calcium chloride solution (50 g. per liter) and the remainder added water and accelerator. The accelerator is added to the water-calcium chloride solution and then mixed with the silicate solution. The compositions are allowed to gel at 70° F. and the time required for gelation is determined with a Mol-Rez Gel Time Meter. In Sample 50, the trioxane is added as an aqueous solution containing 100 grams trioxane per liter of water. The results are reported in Table III.

TABLE III

| Sample No. | Accelerator | Acelerator (Vol. Percent) | Water (Vol. Percent) | Gel Time (Min.) |
|---|---|---|---|---|
| 49 | | | 30 | 91 |
| 50 | Trioxane¹ | 30 | | 8 |
| 51 | Formic Acid | 2 | 28 | (²) |
| 52 | do | 0.4 | 29.6 | (²) |
| 53 | do | 0.16 | 29.84 | 73 |
| 54 | Butyl Acetate | 2 | 28 | 56 |
| 55 | Acetone | 0.4 | 29.6 | (²) |
| 56 | do | 2 | 28 | 48 |
| 57 | Ethanol | 0.4 | 29.6 | 8 |
| 58 | do | 2 | 28 | 42 |
| 59 | Diethyl ether | 2 | 28 | 30 |

¹ Added as an aqueous solution of 100 grams trioxane per liter of water.
² Instant gelation.

*Example 4*

This example illustrates that the accelerators of the present invention are operative and decrease the gelation time of soil stabilizing compositions which do not contain a reactive salt. The compositions contain, by volume, 50 percent sodium silicate solution, 20 percent formamide and the remainder added water and accelerator. The accelerator is added to the water-formamide mixture and then mixed with the silicate solution. The compositions are allowed to gel at 70° F. and the time required for gelation is determined with a Mol-Rez Gel Time Meter. The results are reported in Table IV.

TABLE IV

| Sample No. | Accelerator | Acelerator (Vol. Percent) | Water (Vol. Percent) | Gel Time (Min.) |
|---|---|---|---|---|
| 60 | | | 30 | 35 |
| 61 | Trioxane¹ | 2 | 28 | 24 |
| 62 | do¹ | 10 | 20 | 1.5 |
| 63 | do¹ | 30 | | (²) |
| 64 | Formic acid | 0.16 | 29.84 | 2.5 |
| 65 | do | 0.4 | 29.6 | ³ 20 |
| 66 | Butyl acetate | 2 | 28 | 8 |
| 67 | Acetone | 0.4 | 29.6 | 5 |
| 68 | Ethanol | 0.6 | 29.4 | 7 |
| 69 | do | 2 | 28 | (²) |
| 70 | Diethyl ether | 0.4 | 29.6 | 23 |
| 71 | do | 2 | 28 | (²) |

¹ Added as an aqueous solution of 100 grams trioxane per liter of water.
² Instant gelation.
³ Seconds.

*Example 5*

This example illustrates that, when neither an amide nor reactive salt is present in the soil stabilizing composition which also contains gel accelerators of the present invention, no gel is formed within a period of 24 hours or the gel dehydrates and forms a gummy mass. Formic acid forms a gel (Sample 75); however, upon standing, the gel so formed shrinks to approximately one-half of its original volume. The compositions contain, by volume, 50 percent sodium silicate solution and the remainder added water and accelerator. The compositions are held at a temperature of 70° F. and the time required for gelation is determined with a Mol-Rez Gel Time Meter. The results are reported in Table V.

TABLE V

| Sample No. | Accelerator | Accelerator (Vol. Percent) | Water (Vol. Percent) | Gel Time, hrs. | Observations |
|---|---|---|---|---|---|
| 72 | Trioxane [1] | 50 | | >24 | |
| 73 | Formic acid | 0.16 | 49.84 | >24 | |
| 74 | do | 1.6 | 48.4 | >24 | |
| 75 | do | 2 | 48 | (3) | Gel which formed shrunk to approximately ½ original size. |
| 76 | Butyl acetate [2] | 4 | 46 | >24 | |
| 77 | Acetone | 10 | 40 | | Dehydration occurs resulting in a gummy product. |
| 78 | do | 8 | 42 | | Do. |
| 79 | do | 6 | 44 | >24 | |
| 80 | do | 4 | 46 | >24 | |
| 81 | Ethanol | 20 | 30 | | Dehydration occurs resulting in a gummy product. |
| 82 | do | 10 | 40 | | Do. |
| 83 | do | 6 | 44 | >24 | |
| 84 | do | 4 | 46 | >24 | |
| 85 | Diethyl ether | 4 | 46 | >24 | |
| 86 | do | 8 | 42 | >24 | |
| 87 | do | 12 | 38 | >24 | |

[1] Added as an aqueous solution of 100 grams trioxane per liter of water.
[2] Not all dissolved.

*Example 6*

This example illustrates that the gelation time of a soil stabilizing composition, using 5 grams of trioxane, does not vary at the indicated operation temperatures. A series of soil stabilizing compositions are prepared according to the method of Example 1, containing, by volume, 50 percent sodium silicate, 10 percent formamide, and 10 percent calcium chloride solution (50 g. per liter) with the trioxane dissolved in water in amounts as indicated in Table VI.

TABLE VI

| Sample No. | Accelerator | Method of adding Accelerator | Accelerator (g.) | Water (Vol. Percent) | Gel Time (Min.) | Temperature (° F.) |
|---|---|---|---|---|---|---|
| 8 | Trioxane | To H2O—CaCl2—CHONH2 mixture | 5 | 28.4 | 1.5 | 75 |
| 88 | do | do | 5 | 28.4 | 1.5 | 45 |
| 89 | do | do | 5 | 28.4 | 1.5 | 40 |

*Example 7*

This example illustrates that the gel time of a soil stabilizing composition, containing formaldehyde may be accelerated by combining trioxane (cyclic trimer of formaldehyde, containing no free aldehyde groups) with the formaldehyde. The soil stabilizing compositions of this example are prepared according to the method of Example 1. The trioxane is added, as a water solution containing 100 grams trioxane per liter of water. The formaldehyde is added for formalin (37% formaldehyde, 12% methyl alcohol and the remainder water). Table VII contains the gel times observed, and formaldehyde-trioxane content of each sample.

TABLE VII

| Sample No. | Formalin (Vol. Percent) | Trioxane [1] (Vol. Percent) | Water (Vol. Percent) | Gel Time (Min.) |
|---|---|---|---|---|
| 1 | | | 30 | 41 |
| 90 | 15 | | 15 | 54 |
| 91 | | 4 | 19 | (2) |
| 92 | 6 | 16 | 8 | 17 |
| 93 | 15 | 15 | | 3 |
| 94 | 10 | 10 | 10 | 137 |
| 95 | 8 | 12 | 10 | 60 |

[1] Added as a water solution containing 100 grams trioxane per liter.
[2] Instant gelation.

It will be observed that when 15 percent, by volume, formalin is present in the soil stabilizing composition (Sample 90), the gel time is 54 minutes. When 16 and 15 percent, by volume, of the trioxane solution is combined with 6 and 15 percent, by volume, of formaldehyde, respectively, the gel times are decreased to 17 and 3 minutes, respectively (Samples 92 and 93). However, when less than 50 percent of the formaldehyde-trioxane-water mixture is trioxane, no decrease in gel time is observed (Samples 94 and 95).

It is to be understood that although the invention has been described with specific reference to particular embodiments thereof, it is not to be so limited since changes and alterations therein may be made which are within the full intended scope of this invention, as defined by the appended claims.

What is claimed is:

1. A composition of matter capable of forming a gel consisting essentially of from about 5 to about 97.9 percent by volume of an aqueous alkali metal silicate containing 35 to 45 percent solids by weight and having an alkali metal oxide to $SiO_2$ weight ratio of from 1:3.0 to 1:4.0; from 2 to 65 percent by volume of a compound A selected from the group consisting of amides having the structure $$R-\overset{O}{\underset{\|}{C}}-NH_2$$

wherein R is selected from the group consisting of H, lower alkyl, $-CONH_2$ and lower alkyl substituted amido groups, reactive salt solutions capable of forming substantially water-insoluble gels with said silicate and containing about 50 grams per liter of said reactive salt, and mixtures thereof; about 0.1 to 30 percent by volume of at least one additive compound selected from the group consisting of the following structures:

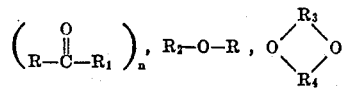

mixtures thereof, and mixtures of formaldehyde with at least one of the above compounds, wherein R is a member selected from the group consisting of hydrogen and a hydrocarbon radical of from 1 to 22 carbon atoms; $R_1$ is a member selected from the group consisting of a hydrocarbon radical of from 1 to 22 carbon atoms and $-O-R$; $n$ is an integer from 1 to 100, inclusive; $R_2$ is a hydrocarbon radical of from 1 to 22 carbon atoms; $R_3$ is a lower alkyl radical of from 1 to 4 carbon atoms, and $R_4$ is a member selected from the group consisting of $R_3$, $R_3$—O—$R_3$ and $R_3$—O—$R_3$—O—$R_3$—, and the balance being added water, characterized in that said additive compound acts to decrease the time required for the composition to form the desired gel.

2. A composition of matter as in claim 1 wherein compound A is a reactive salt solution capable of forming a substantially water-insoluble gel with said silicate.

3. A composition of matter as in claim 1 wherein compound A is an amide.

4. A composition of matter as in claim 1 wherein compound A is a mixture of an amide and a reactive salt solution capable of forming a substantially water-insoluble gel with said silicate.

5. A composition of matter as in claim 1 wherein the additive compound is selected from the group consisting of acetaldehyde, propionaldehyde, n-butyraldehyde, paraldehyde, trioxane, dioxane, furfural, acetone, methyl ethyl ketone, formic acid, lactic acid, butyl acetate, amyl acetate, methanol, ethanol, diethyl ether, iso-butyraldehyde, benzaldehyde, o-chlorobenzaldehyde, mixtures thereof and mixtures of formaldehyde with at least one of the additive compounds.

6. A composition of matter as in claim 5 wherein compound A is a reactive salt solution capable of forming a substantially water-insoluble gel with said silicate.

7. A composition of matter as in claim 5 wherein compound A is an amide.

8. A composition of matter as in claim 5 wherein compound A is a mixture of an amide and a reactive salt solution capable of forming a substantially water-insoluble gel with said silicate.

9. The composition of claim 1 wherein the structural formula of the compound represents a carboxylic acid and $n$ is 1.

10. The composition of claim 1 wherein the structural formula of the compound represents a carboxylic acid ester and $n$ is 1.

11. The composition of claim 1 wherein the structural formula of the compound represents a ketone and $n$ is 1.

12. The composition of claim 1 wherein the structural formula of the compound represents an aldehyde and $n$ is an integer of from 1 to 100, inclusive.

13. The composition of claim 1 wherein the structural formula of the compound represents an alcohol.

14. The composition of claim 1 wherein the structural formula of the compound represents an ether.

15. The composition of claim 1 wherein the structural formula of the compound represents a cyclic polymer of a lower alkyl aldehyde.

16. A process for accelerating the gelation time of an aqueous soil stabilizing composition consisting essentially of about 5 to 97.9 percent, by volume, of an aqueous metal silicate containing 35 to 45 percent solids by weight and having an alkali metal oxide to $SiO_2$ weight ratio of from 1:3.0 to 1:4.0; about 2 to 65 percent, by volume, of a compound selected from the group consisting of an amide having the structure

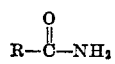

where R is selected from the group consisting of H, lower alkyl, —$CONH_2$ and lower alkyl substituted amido groups, reactive salt solution capable of forming substantially water-insoluble gels with said silicate and containing 50 grams reactive salt per liter and mixtures thereof, which comprises the addition to said composition of about 0.1 to 30 percent, by volume, of at least one compound capable of accelerating the gelation time of said composition selected from the group consisting of the following structures:

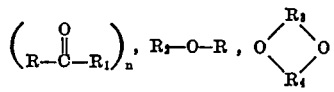

mixtures thereof, and mixtures of formaldehyde with at least one of the above compounds, wherein R is a member selected from the group consisting of hydrogen and a hydrocarbon radical of from 1 to 22 carbon atoms; $R_1$ is a member selected from the group consisting of a hydrocarbon radical of from 1 to 22 carbon atoms and —O—R; $n$ is an integer from 1 to 100, inclusive; $R_2$ is a hydrocarbon radical of from 1 to 22 carbon atoms; $R_3$ is a lower alkyl radical of from 1 to 4 carbon atoms and $R_4$ is a member selected from the group consisting of $R_3$, $R_3$—O—$R_3$ and $R_3$—O—$R_3$—O—$R_3$—; and the balance being added water.

17. The method of claim 16 wherein the accelerator is a carboxylic acid and $n$ is 1.

18. The method of claim 16 wherein the accelerator is a carboxylic acid and $n$ is 1.

19. The method of claim 16 wherein the accelerator is a ketone and $n$ is 1.

20. The method of claim 16 wherein the accelerator is an aldehyde and $n$ is an integer of from 1 to 100, inclusive.

21. The method of claim 16 wherein the accelerator is an alcohol.

22. The method of claim 16 wherein the accelerator is an ether.

23. The method of claim 16 wherein the accelerator is a cyclic polymer of a lower alkyl aldehyde.

24. The method of claim 16 wherein the amide is formamide.

25. The method of claim 16 wherein the reactive salt is calcium chloride.

26. A process for accelerating the gelation time of an aqueous soil stabilizing composition consisting essentially of about 5 to 97.9 percent by volume of an aqueous alkali metal silicate containing 35 to 45 percent solids by weight and having an alkali metal oxide to $SiO_2$ weight ratio of from 1:3.0 to 1:4.0; about 2 to 65 percent, by volume, of a compound selected from the group consisting of amides having the structure

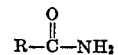

wherein R is selected from the group consisting of H, lower alkyl, —$CONH_2$ and lower alkyl-substituted amido groups, reactive salt solutions capable of forming substantially water-insoluble gels with said silicate and containing about 50 grams of said reactive salt per liter and mixtures thereof, which process comprises the addition to said composition of about 0.1 to 30 percent by volume, of at least one additive compound capable of accelerating the gelation time of said composition selected from the group consisting of acetaldehyde, propionaldehyde, n-butyraldehyde, paraldehyde, trioxane, dioxane, furfural, acetone, methyl ethyl ketone, formic acid, lactic acid, butyl acetate, amyl acetate, methanol, ethanol, diethyl ether, iso-butyraldehyde, benzaldehyde, o-chlorobenzaldehyde, mixtures thereof and mixtures of formaldehyde with at least one of the additive compounds, and the balance being added water.

27. A process for accelerating the gelation time of an aqueous soil stabilizing composition containing about 35 to 75 percent, by volume, aqueous sodium silicate containing 35 to 45 percent solids by weight and having an $Na_2O:SiO_2$ weight ratio of about 1:3.0 to 4.0; about 5 to 30 percent, by volume, of a compound selected from the group consisting of formamide, calcium chloride solution containing 50 grams calcium chloride per liter and mixtures thereof, which comprises the addition to said composition of about 1 to 30 percent, by volume, of at least one compound capable of accelerating the gelation time of said composition selected from the group consisting of the following structures:

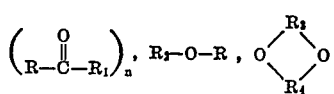

mixtures thereof, and mixtures of formaldehyde with at

13 least one of the above compounds, wherein R is a member selected from the group consisting of hydrogen and a hydrocarbon radical of from 1 to 22 carbon atoms; $R_1$ is a member selected from the group consisting of a hydrocarbon radical of from 1 to 22 carbon atoms and —O—R; $n$ is an integer from 1 to 100, inclusive; $R_2$ is a hydrocarbon radical of from 1 to 22 carbon atoms; $R_3$ is a lower alkyl radical of from 1 to 4 carbon atoms and $R_4$ is a member selected from the group consisting of $R_3$, $R_3$—O—$R_3$ and $R_3$—O—$R_3$—O—$R_3$—; and the balance being added water.

28. Soil stabilized by admixture with a composition consisting essentially of about 35 to 75 percent, by volume, aqueous sodium silicate containing 35 to 45 percent solids by weight and having an $Na_2O:SiO_2$ weight ratio of about 1:3.0 to 4.0; about 5 to 30 percent, by volume, of a compound selected from the group consisting of formamide, calcium chloride solution containing 50 grams calcium chloride per liter and mixtures thereof, about 1 to 30 percent, by volume, of at least one compound selected from the group consisting of the following structures:

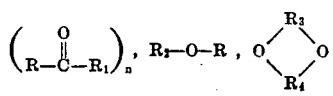

14 mixtures thereof, and mixtures of formaldehyde with at least one of the above compounds, wherein R is a member selected from the group consisting of hydrogen and a hydrocarbon radical of from 1 to 22 carbon atoms; $R_1$ is a member selected from the group consisting of a hydrocarbon radical of from 1 to 22 carbon atoms and —O—R; $n$ is an integer from 1 to 100, inclusive; $R_2$ is a hydrocarbon radical of from 1 to 22 carbon atoms; $R_3$ is a lower alkyl radical of from 1 to 4 carbon atoms and $R_4$ is a member selected from the group consisting of $R_3$, $R_3$—O—$R_3$ and $R_3$—O—$R_3$—O—$R_3$—, and the balance being added water.

References Cited by the Examiner

UNITED STATES PATENTS

| 2,069,486 | 2/1937 | Tilden | 106—74 |
| 2,968,572 | 1/1961 | Peeler | 106—287 |
| 3,149,985 | 9/1964 | Gandon | 106—287 |

FOREIGN PATENTS 865,744   3/1961   Great Britain.

TOBIAS E. LEVOW, *Primary Examiner.*
S. E. MOTT, *Assistant Examiner.*

---

UNITED STATES PATENT OFFICE
CERTIFICATE OF CORRECTION

Patent No. 3,306,756                                February 28, 1967

George A. Miller

It is hereby certified that error appears in the above numbered patent requiring correction and that the said Letters Patent should read as corrected below.

Column 2, lines 3 to 6, the formula should appear as shown below instead of as in the patent:

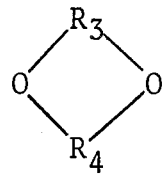

column 6, line 28, for "diffeernt" read -- different --; column 9, line 28, for "operation" read -- operating --; column 12, line 15, after "acid" insert -- ester --.

Signed and sealed this 17th day of October 1967.

(SEAL)
Attest:

EDWARD M. FLETCHER, JR.
Attesting Officer

EDWARD J. BRENNER
Commissioner of Patents